(12) United States Patent
Park et al.

(10) Patent No.: US 8,223,603 B2
(45) Date of Patent: Jul. 17, 2012

(54) FREQUENCY DETECTION APPARATUS AND METHOD FOR GENERATION OF A CLOCK SIGNAL FOR OPTICAL DISC

(75) Inventors: Hyun-soo Park, Seoul (KR); Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2345 days.

(21) Appl. No.: 10/842,646

(22) Filed: May 11, 2004

(65) Prior Publication Data
US 2005/0007929 A1    Jan. 13, 2005

(30) Foreign Application Priority Data
May 13, 2003  (KR) .................. 10-2003-0030361

(51) Int. Cl.
*G11B 7/00* (2006.01)
(52) U.S. Cl. .................. 369/47.26; 369/124.13
(58) Field of Classification Search ............... 369/59.22, 369/47.26, 59.12, 124.13; 381/98, 94.1, 381/94.2, 94.3, 103; 330/302, 303, 304; 708/300–313
See application file for complete search history.

(56) References Cited

U.S. PATENT DOCUMENTS

| | | | |
|---|---|---|---|
| 5,666,341 A * | 9/1997 | Horibe et al. | 369/47.28 |
| 6,122,120 A * | 9/2000 | Shimoda | 360/46 |
| 6,194,885 B1 * | 2/2001 | Oshima | 323/285 |
| 6,418,101 B1 * | 7/2002 | Finkelstein | 369/47.18 |
| 6,434,206 B1 * | 8/2002 | Yu | 375/376 |
| 2003/0016605 A1 * | 1/2003 | Tateyama et al. | 369/47.26 |
| 2003/0021208 A1 * | 1/2003 | Ogura | 369/59.22 |

FOREIGN PATENT DOCUMENTS

| | | |
|---|---|---|
| JP | 1027435 | 1/1989 |
| JP | 10-27435 | 1/1998 |
| JP | 10-112141 | 4/1998 |
| JP | 2001184804 | 7/2001 |
| KR | 1998-34882 | 5/1999 |
| KR | 10-2000-0008718 A | 2/2000 |
| KR | 10-2000-0032909 A | 6/2000 |
| KR | 10-2000-0033889 A | 6/2000 |
| KR | 10-2000-0074813 A | 12/2000 |
| KR | 2001-11117 | 2/2001 |

OTHER PUBLICATIONS

Office Action issued in corresponding Korean Patent Application No. 10-2003-0030361 dated Jun. 9, 2009.

* cited by examiner

*Primary Examiner* — Thomas Alunkal
(74) *Attorney, Agent, or Firm* — NSIP Law

(57) ABSTRACT

A frequency detection apparatus and method for generating a stable clock signal synchronized with an input signal and a signal boost filter used in the frequency detection apparatus and method, the frequency detection apparatus includes a signal boost filter filtering out the high frequency component of an input signal and boosting the high frequency component, and a frequency detector receiving an input signal with the boosted high frequency component and a clock signal, detecting a frequency difference between the input signal and the clock signal, and producing a control voltage corresponding to the frequency difference. Accordingly, even when there is a big difference between the frequency of the input signal and an oscillating frequency, a frequency error can be stably detected. Thus, a stable clock signal can be obtained.

22 Claims, 4 Drawing Sheets

FREQUENCY DETECTION APPARATUS AND METHOD FOR GENERATION OF A CLOCK SIGNAL FOR OPTICAL DISC

CROSS-REFERENCE TO RELATED APPLICATIONS

This application claims the benefit of Korean Patent Application No. 2003-30361, filed on May 13, 2003, in the Korean Intellectual Property Office, the disclosure of which is incorporated herein by reference.

BACKGROUND OF THE INVENTION

1. Field of the Invention

The present invention relates to the generation of a clock signal used to reproduce data from an optical disc, and more particularly, to a frequency detection apparatus and method for generating a stable clock signal synchronized with an input signal and a signal boost filter used in the frequency detection apparatus and method.

2. Description of the Related Art

A binary signal value is recorded on the surface of an optical disc, such as a compact disc (CD) or a digital versatile disc (DVD) and can be reproduced by reading an optical signal corresponding to light. The light may be a laser incident upon the optical disc and reflected thereby. Although the binary signal value is recorded on the optical disc, the optical signal read by the optical disc is a radio frequency (RF) signal because of the characteristics of the optical disc. Hence, a process for converting the read-out optical signal into a digital signal is required.

To restore data stored in the optical disc, an analog-to-digital converter (ADC) and a phase locked loop (PLL) circuit are required. The PLL circuit outputs a system clock signal used to restore digital data in synchronization with an input signal.

FIG. 1 is a block diagram of a general PLL circuit, which includes a phase detector (PD) 110, a loop filter 120, and a voltage controlled oscillator (VCO) 130.

The PD 110 detects a phase difference between an input signal and a clock signal output by the VCO 130. The detected phase difference is applied to the loop filter 120. The loop filter 120 accumulates the components of detected phase differences, converts the accumulated component into a control voltage signal, and applies the control voltage signal to the VCO 130. The VCO 130 produces a clock signal in response to the control voltage signal received from the loop filter 120.

FIG. 2 is a block diagram of a general PLL circuit formed by adding a frequency detector (FD) 140 to the PLL circuit of FIG. 1.

In general, the range of frequency signals that a PLL circuit can synchronize is limited due to the characteristics of the loop filter 120. In practice, the range of frequency signals that a PLL circuit can synchronize is significantly narrow. When there is a big difference between the frequency of the input signal and the frequency of the clock signal output by the VCO 130, the PLL circuit does not operate. Thus, synchronizing the input signal with the clock signal is impossible. To solve this problem, the frequency of the clock signal output by the VCO 130 is made similar to the frequency of the input signal using the FD 140 so that the PLL circuit can operate.

The FD 140 may have various structures. The input signal includes a data signal and a sync signal. The FD 140 is generally designed to detect the frequency of an input signal using a component signal having the longest period among component signals included in a sync signal. In optical discs, such as a DVD, the longest period of a data signal is a 14T (where T is a basic period) period included in a sync signal. When a PLL circuit normally operates, a signal with a 14T period is detected. However, when the frequency of a clock signal of the VCO 130 increases or decreases, a signal having a period longer or shorter than the 14T period is detected. Hence, the FD 140 detects a maximum period in a predetermined frequency range of the input signal and ascertains the difference between the frequencies of the input signal and clock signal using the difference between the detected period and the 14T period.

FIGS. 3A and 3B illustrate a case where an error in an input signal exceeds a binary level. If the magnitude of the input signal is greater than a binary level of 0, it is detected as 1. If the magnitude of the input signal is smaller than the binary level of 0, it is detected as 0. With a recent increase in the recording density of an optical disc, the quality of a signal reproduced degrades. Due to the degradation of the quality of the reproduced signal, the error in the input signal may exceed a binary level as illustrated in FIGS. 3A and 3B. In this case, the input signal is not accurately detected, and thus the longest period of the input signal may be wrongly detected. In other words, as illustrated in FIG. 3A, a portion 310 of an original signal is detected as 1, but as illustrated in FIG. 3B, a portion 320 of a distorted signal corresponding to the portion 310 is detected as 0. Hence, the maximum period may be wrongly detected, which requires a signal boost filter which boosts a high frequency component of an input signal around a binary level.

SUMMARY OF THE INVENTION

The present invention provides a frequency detection apparatus and method and a signal boost filter used in the frequency detection apparatus and method, by which even when the input signal is distorted due to noise or when the frequency of an oscillating clock signal radically changes, the frequency of an input signal is accurately detected so that a stable clock signal can be produced.

According to an aspect of the present invention, there is provided a frequency detection apparatus comprising: a signal boost filter filtering out a high frequency component of an input signal and boosting the high frequency component; and a frequency detector receiving the input signal with the boosted high frequency component and a clock signal, detecting a frequency difference between the input signal and the clock signal, and producing a control voltage corresponding to the frequency difference.

According to another aspect of the present invention, there is provided a signal boost filter comprising: a first filter filtering out the high frequency component of an input signal and boosting the high frequency component; a limiter receiving an output signal of the first filter and outputting a signal with an upper limit value if the value of the received signal exceeds the upper limit value and a signal with a lower limit value if the value of the received signal exceeds the lower limit value; a second filter receiving the output signals of the limiter, filtering out a high frequency component of the received signals, and boosting a high frequency component of the signals; and an adder adding the input signal having a boosted high frequency component to the output signal of the second filter.

According to another aspect of the present invention, there is provided a signal boost filter comprising: a nonlinear converter, if a magnitude of an input signal exceeds a predetermined range, controlling the input signal using the predetermined range and outputting a controlled input signal and, if the magnitude of the input signal exists within the predetermined range, outputting a signal of 0; a filter filtering out a high frequency component of the output signal of the nonlinear converter; and an adder adding the input signal with the boosted high frequency component to an output signal of the filter.

According to another aspect of the present invention, there is provided a frequency detection method comprising: filtering out a high frequency component of an input signal and boosting the high frequency component; and receiving an input signal with the boosted high frequency component and a clock signal, detecting a frequency difference between the input signal and the clock signal, and producing a control voltage corresponding to the frequency difference.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
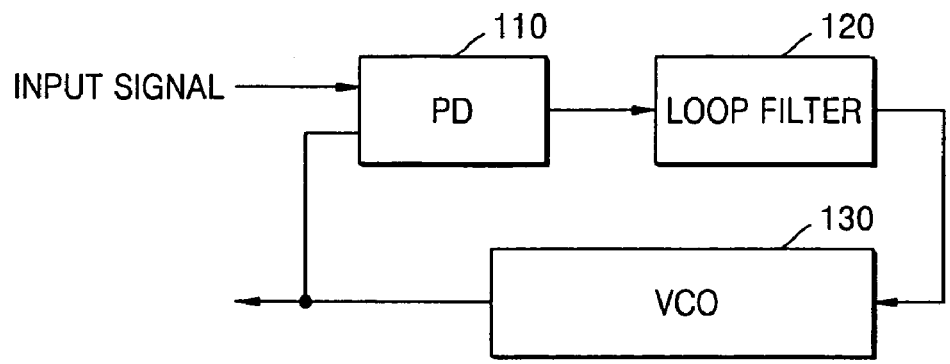
FIG. 1 is a block diagram of a general phase locked loop (PLL) circuit.
Figure 2:
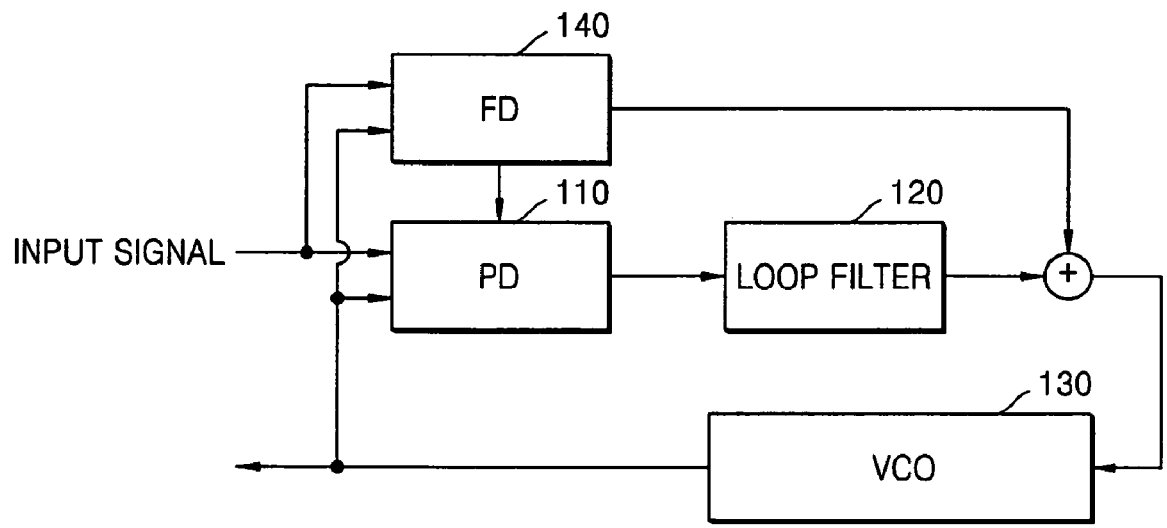
FIG. 2 is a block diagram of a general PLL circuit formed by adding a frequency detector to the PLL circuit of FIG. 1.
Figure 3A:
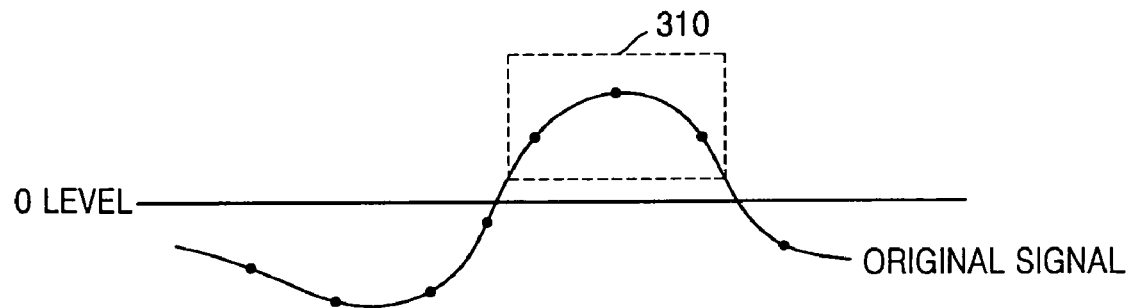
FIGS. 3A and 3B illustrate a case where an error in an input signal exceeds a binary level.
Figure 3B:
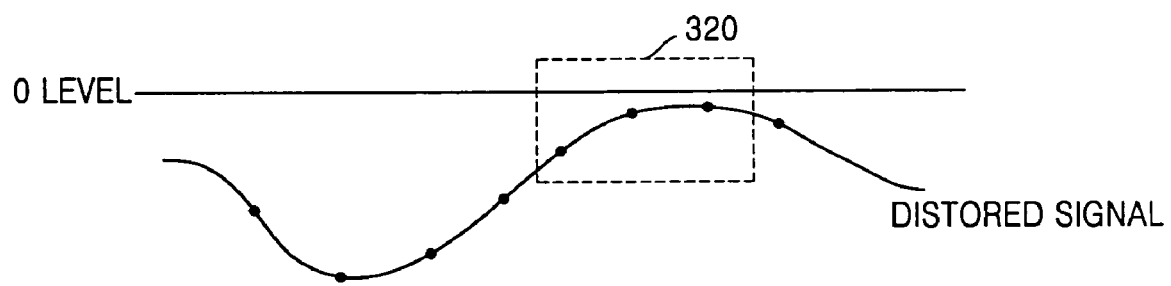

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
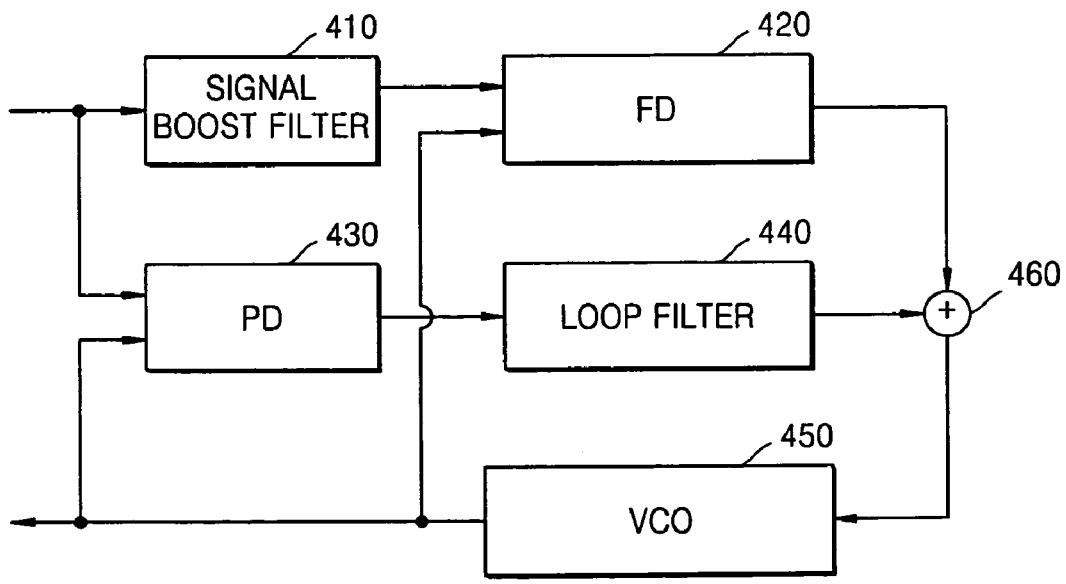
FIG. 4 is a block diagram of a PLL circuit according to an embodiment of the present invention.

Referring to FIG. 4, a phase locked loop (PLL) circuit includes a signal boost filter 410, a frequency detector (FD) 420, a phase detector (PD) 430, a loop filter 440, and a voltage controlled oscillator (VCO) 450. An RF signal read out from an optical disc is applied to the signal boost filter 410 and the PD 430. The signal boost filter 410 boosts the RF signal to increase the efficiency of detecting the frequency of the input RF signal.

The signal boost filter 410 boosts a frequency component of the input signal, particularly, the high frequency component thereof. The input signal includes much noise because of various causes. Particularly, noise exists around a reference level of the input signal which serves as a basis of determining whether the input signal is 0 or 1. Hence, if the high frequency component of the input signal, which greatly varies, is greatly boosted, a data reproduction error due to high frequency noise around the reference level can be prevented.

The PD 430 detects a phase difference between the input signal and a clock signal output by the VCO 450 and outputs the phase difference, which is a phase error, to the loop filter 440. The loop filter 440 filters the phase error and converts the phase error into a control voltage for controlling the frequency of the clock signal of the VCO 450.

The signal boost filter 410 outputs the boosted input signal to the FD 420. The FD 420 detects a maximum period of a component signal among a plurality of component signals included in the boosted input signal, compares the detected maximum period with the 14T frequency period of a sync signal, and outputs a voltage corresponding to the difference between the two periods.

The output signals of the FD 420 and the loop filter 440 are summed by an adder 460. More specifically, the FD 420 outputs a voltage depending on the frequency error, and the loop filter 440 outputs a voltage depending on the phase error. The two voltages are summed, and the sum is applied to the VCO 450. The VCO 450 generates an oscillating clock signal having a desired frequency. In other words, the VCO 450 receives a control voltage and generates a clock signal having a frequency corresponding to the control voltage.

Figure 5:
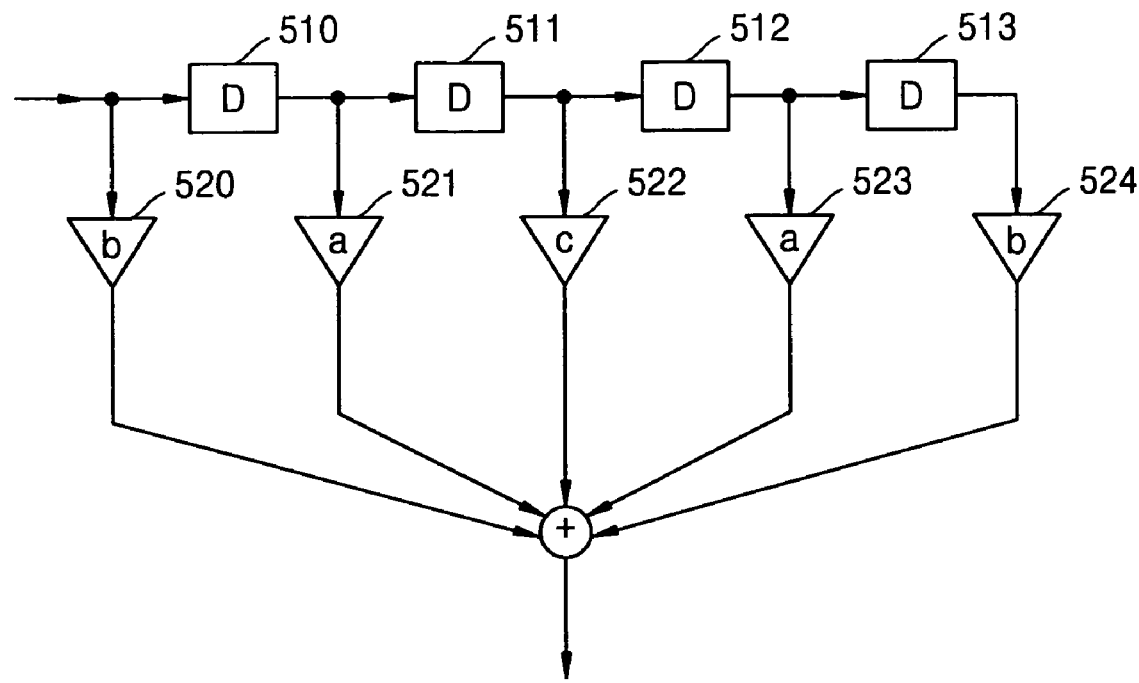
FIG. 5 is a block diagram of a signal boost filter according to an embodiment of the present invention.

FIG. 5 is a block diagram of the structure of a signal boost filter according to an embodiment of the present invention. Referring to FIG. 5, the signal boost filter is a symmetrical FIR filter including delayers 510 through 513 and multipliers 520 through 524. The signal boost filter delays an input signal for a predetermined clock time using the delayers 510 through 513, such as, flip-flops, multiplies each of the delayed signals output by the delayers 510 through 513 by a predetermined constant such as, a, b, or c, and sums the multiplied signals, thereby boosting a specific frequency component of the input signal.

Figure 6:
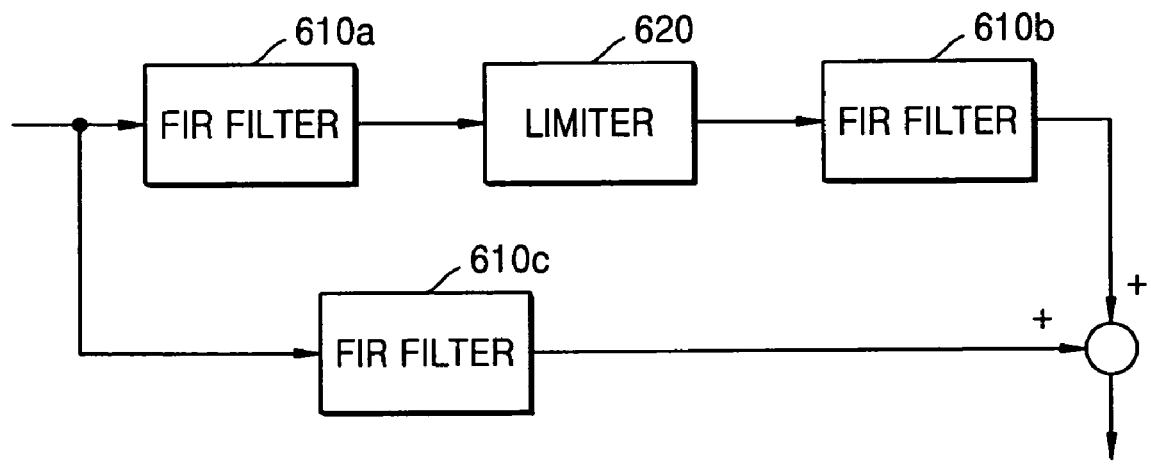
FIG. 6 is a block diagram of a signal boost filter according to another embodiment of the present invention.

FIG. 6 is a block diagram of the structure of a signal boost filter according to another embodiment of the present invention. Referring to FIG. 6, the signal boost filter includes FIR filters 610a through 610c and a limiter 620. Each of the FIR filters 610a through 610c has the same structure as that of the symmetrical FIR filter of FIG. 5 and boosts the high frequency component of an input signal. The limiter 620 has an upper limit value and a lower limit value. If the limiter 620 receives a signal whose value is greater than the upper limit value, it outputs a signal with the upper limit value. On the other hand, if the limiter 620 receives a signal whose value is smaller than the lower limit value, it outputs a signal with the lower limit value. This rule can be expressed as Equation 1:

$$y = x \times \{|x| \leq k\} + k(-1)^{\{x \leq 0\}} \times \{|x| > k\} \quad (1)$$

wherein | | denotes an absolute value, { } denotes the output of 1 if a conditional expression is true or the output of 0 if the conditional expression is false, x denotes an input signal, and k denotes 0 or a predetermined positive real number.

More specifically, if $|x| \leq k$, y is equal to x. If $|x| > k$ and $x > 0$, y is equal to k. If $|x| > k$ and $x < 0$, y is equal to $-k$.

Figure 7:
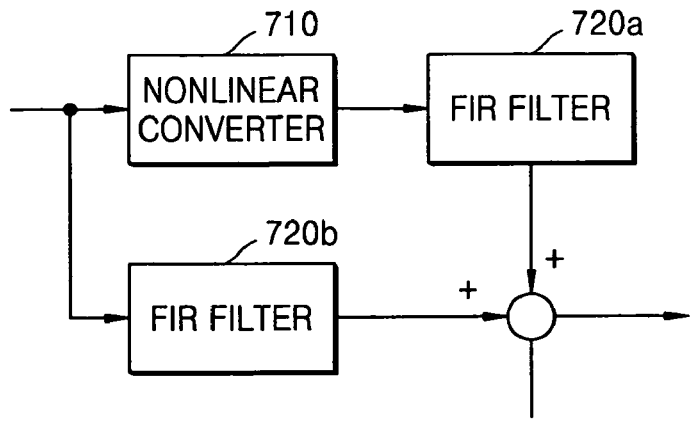
FIG. 7 is a block diagram of a signal boost filter according to still another embodiment of the present invention.

FIG. 7 is a block diagram of the structure of a signal boost filter according to another embodiment of the present invention. Referring to FIG. 7, the signal boost filter includes a nonlinear converter 710 and FIR filters 720a and 720b. Each of the FIR filters 720a and 720b has the same structure as that of the symmetrical FIR filter of FIG. 5 and boosts the high frequency component of an input signal. The nonlinear converter 710 outputs an input signal only when the value of the input signal is greater or smaller than a predetermined value. This will now be described in detail with reference to FIG. 8.

Figure 8:
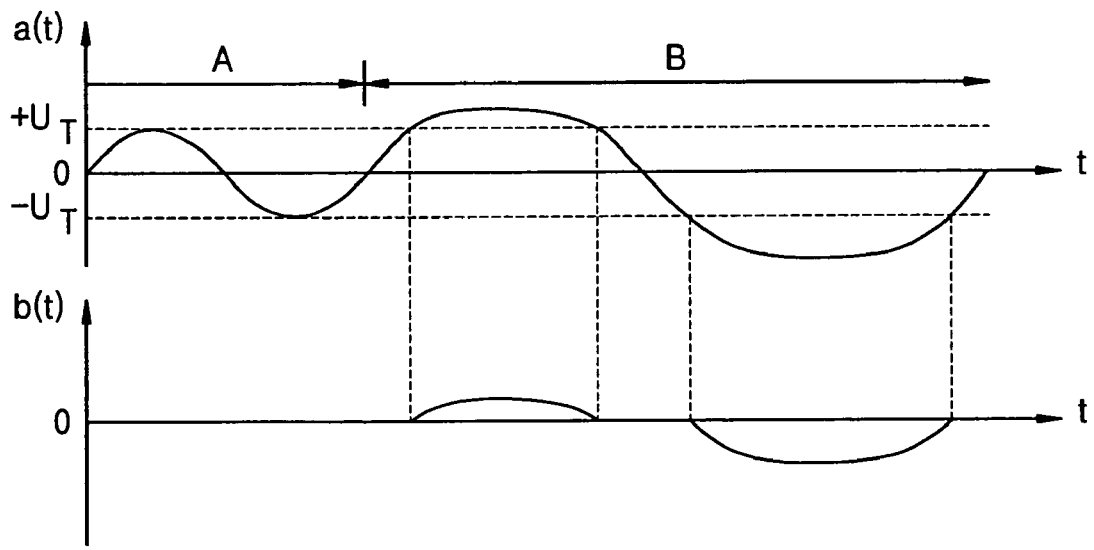
FIG. 8 is a graph illustrating an input signal and an output signal of a nonlinear converter.

FIG. 8 is a graph illustrating an input signal and an output signal of a nonlinear converter. When a predetermined value is $U_T$, if an input signal a(t) is greater than $U_T$, an output signal b(t) is a(t)−$U_T$. If the input signal a(t) is smaller than −$U_T$, the output signal b(t) is a(t)+$U_T$. If the input signal a(t) is in between −$U_T$ and $U_T$, the output signal b(t) is 0.

Figure 9:
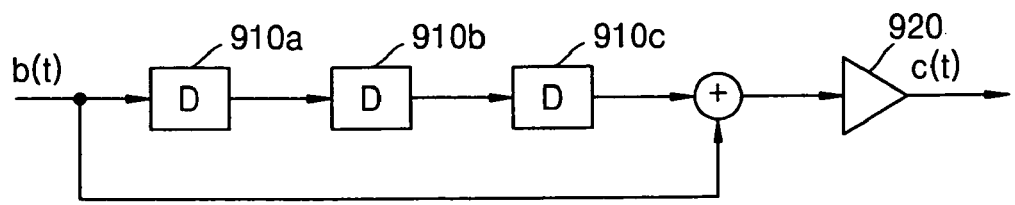
FIG. 9 is a circuit diagram of an FIR filter having a structure different from that of an FIR filter of FIG. 5.

FIG. 9 is a circuit diagram of a symmetrical FIR filter having a structure other than that of the symmetrical FIR filter of FIG. 5. Referring to FIG. 9, each of the FIR filters 720a and 720b of FIG. 7 includes delayers 910a through 910c and a multiplier 920 receiving the output signal b(t) of the nonlinear converter 710 and boosting the high frequency component of the signal b(t).

To sum up the above-described frequency detection process, a high frequency component is filtered out of an RF signal, and the high frequency component is boosted. A frequency difference between an input signal with the boosted high frequency component and an oscillating clock signal of a VCO is detected, and a control voltage corresponding to the frequency difference is produced. The high frequency component is boosted by the aforementioned signal boost filters of FIGS. 6 through 9.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, when a clock signal is produced using a frequency detecting apparatus and method according to the present invention, the following effects are obtained. First, even when the quality of a reproduced signal is not good, a frequency error can be stably determined. Second, even when there is a big difference between the frequency of an input signal and an oscillating frequency, a frequency error can be stably detected. Third, the detection of a stable frequency error increases the stability of a PLL circuit. Fourth, as the stability of a PLL circuit increases, the performance of an optical disc reproducing apparatus improves. Thus, a reliable optical disc reproducing apparatus can be obtained.

What is claimed is:

1. A frequency detection apparatus, comprising:
a signal boost filter configured to filter out and boost a high frequency component of an input signal;
a frequency detector configured to detect a frequency difference between the input signal having the boosted high frequency component and a clock signal and produce a control voltage corresponding to the frequency difference,
wherein the signal boost filter comprises:
a nonlinear converter configured to control the input signal using a predetermined range, the nonlinear converter being configured to output one of a controlled signal if a magnitude of the input signal is greater or less than the predetermined range and a signal of 0 if the magnitude of the input signal is within the predetermined range;
a plurality of filters configured to filter out and boost a high frequency component of the controlled signal and the high frequency component of the input signal; and
an adder configured to add the input signal having the boosted high frequency component to the controlled signal having the boosted high frequency component.

2. The frequency detection apparatus of claim 1, wherein the input signal comprises an RF signal configured to read data recorded on an optical disc.

3. The frequency detection apparatus of claim 1, wherein the clock signal comprises a frequency configured to vary according to the control voltage.

4. The frequency detection apparatus of claim 1, wherein the signal boost filter comprises:
a plurality of delayers configured to produce a plurality of delay signals obtained by delaying the input signal for a predetermined period of time; and
a plurality of multipliers configured to multiply the delay signals by predetermined constants.

5. The frequency detection apparatus of claim 1, wherein the signal boost filter comprises:
a first filter configured to filter out and boost the high frequency component of the input signal;
a limiter configured to output one of a first signal having an upper limit value if a value of the input signal having the boosted high frequency component is greater than the upper limit value and a second signal having a lower limit value if the value of the input signal having the boosted high frequency component is less than the lower limit value;
a second filter configured to filter out and boost a high frequency component of the one of the first and second signals; and
an adder configured to add the input signal having the boosted high frequency component to the one of the first and second signals having the boosted high frequency component.

6. The frequency detection apparatus of claim 5, wherein at least one of the first and second filters comprises an FIR filter.

7. The frequency detection apparatus of claim 1, wherein the nonlinear converter is configured to output a signal of a(t)−$U_T$ as the controlled signal when a magnitude a(t) of the input signal is greater than a predetermined value $U_T$,
wherein the nonlinear converter is configured to output a signal of a(t)+$U_T$ as the controlled signal when the magnitude a(t) of the input signal is less than a predetermined value −$U_T$, and
wherein the nonlinear converter is configured to output a signal of 0 when the magnitude a(t) of the input signal is in between −$U_T$ and $U_T$.

8. The frequency detection apparatus of claim 1, Wherein the plurality of filters each comprise an FIR filter.

9. The frequency detection apparatus of claim 1, wherein one of the plurality of filters is configured to receive the controlled signal from the nonlinear converter, sum a signal obtained by delaying the controlled signal using a plurality of delayers with the controlled signal of the nonlinear converter, and multiply a result of the sum by a predetermined constant to provide the controlled signal having the boosted high frequency component.

10. A signal boost filter, comprising:
a nonlinear converter configured to control an input signal using a predetermined range, the nonlinear converter being configured to output one of a controlled signal if a magnitude of the input signal is greater or less than the predetermined range and a signal of 0 if the magnitude of the input signal is within the predetermined range;
a plurality of filters configured to filter out and boost high frequency components of the input signal and the controlled signal; and
an adder configured to add the input signal having the boosted high frequency component to the controlled signal having the boosted high frequency component.

11. The signal boost filter of claim 10, wherein the nonlinear converter is configured to output a signal of $a(t)-U_T$ as the controlled signal when a magnitude $a(t)$ of the input signal is greater than a predetermined value $U_T$,
   wherein the nonlinear converter is configured to output a signal of $a(t)+U_T$ as the controlled signal when the magnitude $a(t)$ of the input signal is less than a predetermined value $-U_T$, and
   wherein the nonlinear converter is configured to output a signal of 0 when the magnitude $a(t)$ of the input signal is in between $-U_T$ and $U_T$.

12. The signal boost filter of claim 10, wherein one of the plurality of filters is configured to receive the controlled signal from the nonlinear converter, sum a signal obtained by delaying the controlled signal using a plurality of delayers with the controlled signal of the nonlinear converter, and multiply a result of the sum by a predetermined constant to provide the controlled signal having the boosted high frequency component.

13. A frequency detection method, comprising:
   filtering out and boosting a high frequency component of an input signal;
   detecting a frequency difference between the input signal having the boosted high frequency component and a clock signal; and
   producing a control voltage corresponding to the frequency difference,
   wherein the filtering out and the boosting of the high frequency component comprises:
     controlling the input signal using a predetermined range, the controlling of the input signal comprising outputting, from a nonlinear converter, one of a controlled signal if a magnitude of the input signal is greater or less than the predetermined range and a signal of 0 if the magnitude of the input signal exists within the predetermined range;
     filtering out and boosting a high frequency component of the controlled signal and the high frequency component of the input signal; and
     adding the input signal having the boosted high frequency component to the controlled signal having the boosted high frequency component.

14. The frequency detection method of claim 13, wherein the input signal includes an RF signal configured to read out data recorded on an optical disc.

15. The frequency detection method of claim 13, wherein the boosting of the high frequency component comprises:
   producing a plurality of delay signals obtained by delaying the input signal for a predetermined period of time; and
   multiplying the delay signals by predetermined constants.

16. The frequency detection method of claim 13, wherein the filtering out and the boosting of the high frequency component comprises:
   filtering out and boosting the high frequency component of the input signal;
   outputting, from a limiter, one of a first signal having an upper limit value if a value of the input signal having the boosted high frequency component is greater than the upper limit value and a second signal having a lower limit value if the value of the input signal having the boosted high frequency component is less than the lower limit value;
   filtering out and boosting a high frequency component of the one of the first and second signals; and
   adding the input signal having the boosted high frequency component to the one of the first and second signals having the boosted high frequency component.

17. The frequency detection method of claim 13, wherein the outputting of the one of the controlled signal and the signal of 0 comprises:
   outputting a signal of $a(t)-U_T$ as the controlled signal when a magnitude $a(t)$ of the input signal is greater than a predetermined value $U_T$;
   outputting a signal of $a(t)+U_T$ as the controlled signal when the magnitude $a(t)$ of the input signal is less than a predetermined value $-U_T$; and
   outputting the signal of 0 when the magnitude $a(t)$ of the input signal is in between $-U_T$ and $U_T$.

18. A frequency detection apparatus comprising:
   a signal boost filter configured to filter and boost a frequency component of an input signal and output a first signal; and
   a frequency detector configured to receive the first signal and a clock signal, detect a frequency difference between the first signal and the clock signal, and produce a control voltage corresponding to the frequency difference,
   wherein the signal boost filter comprises:
   a nonlinear converter configured to control the input signal using a predetermined range, the nonlinear converter being configured to output one of a controlled signal if a magnitude of the input signal is greater or less than the predetermined range and a signal of 0 if the magnitude of the input signal is within the predetermined range;
   a plurality of filters configured to filter out a frequency component of the controlled signal and output a second signal; and
   an adder configured to add the input signal having the boosted high frequency component to the second signal.

19. The frequency detection apparatus of claim 18, wherein the signal boost filter comprises:
   a first filter configured to filter and boost the frequency component of the input signal and output the first signal;
   a limiter configured to receive the first signal and output a second signal having an upper limit value if a value of the first signal exceeds the upper limit value and a third signal having a lower limit value if the value of the first signal exceeds the lower limit value;
   a second filter configured to receive the second and third signals, filter out high frequency components of the second and third signals, boost the high frequency components of the second and third signals, and output a fourth signal; and
   an adder configured to add the first signal having the boosted frequency component of the input signal to the fourth signal.

20. The frequency detection apparatus of claim 19, wherein at least one of the first and second filters comprises an FIR filter.

21. The frequency detection apparatus of claim 18, wherein the nonlinear converter is configured to output a signal of $a(t)-U_T$ as the controlled signal when a magnitude $a(t)$ of the input signal is greater than a predetermined value $U_T$,
   wherein the nonlinear converter is configured to output a signal of $a(t)+U_T$ as the controlled signal when the magnitude $a(t)$ of the input signal is less than a predetermined value $-U_T$, and
   wherein the nonlinear converter is configured to output a signal of 0 when the magnitude $a(t)$ of the input signal is in between $-U_T$ and $U_T$.

22. The frequency detection apparatus of claim 21, wherein the plurality of filters each comprise an FIR filter.

\* \* \* \* \*